US011975602B2

(12) United States Patent
Liu et al.

(10) Patent No.: US 11,975,602 B2
(45) Date of Patent: May 7, 2024

(54) VEHICLE AND ENGINE THEREOF

(71) Applicant: BYD COMPANY LIMITED, Guangdong (CN)

(72) Inventors: Jing Liu, Shenzhen (CN); Nan Zhang, Shenzhen (CN); Shiyi Pan, Shenzhen (CN); Fanchao Meng, Shenzhen (CN); Mingliang Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/214,955

(22) Filed: Jun. 27, 2023

(65) Prior Publication Data

US 2023/0331077 A1    Oct. 19, 2023

Related U.S. Application Data

(63) Continuation of application No. PCT/CN2022/078301, filed on Feb. 28, 2022.

(30) Foreign Application Priority Data

Mar. 1, 2021   (CN) ......................... 202110227888.2

(51) Int. Cl.
*F01P 3/02*      (2006.01)
*B60K 11/04*   (2006.01)
(Continued)

(52) U.S. Cl.
CPC ............... *B60K 11/04* (2013.01); *F01P 3/02* (2013.01); *F01P 7/165* (2013.01);
(Continued)

(58) Field of Classification Search
CPC ... B60K 11/04; F01P 3/02; F01P 7/165; F01P 2003/021; F01P 2003/024; F01P 2007/146
See application file for complete search history.

(56) References Cited

U.S. PATENT DOCUMENTS 8,833,073 B2 *   9/2014  Kuhlbach ............. F02B 39/005
                                                                    123/41.1
10,876,462 B1 * 12/2020  Draisey ................... F02F 1/108
(Continued)

FOREIGN PATENT DOCUMENTS

CN     102182538 A    9/2011
CN     203430618 U    2/2014
(Continued)

OTHER PUBLICATIONS

International Search Report and Written Opinion for Application No. PCT/CN2022/078301, mailed on Apr. 28, 2022, 13 pages.

*Primary Examiner* — Syed O Hasan

(57) ABSTRACT

An engine includes an engine water jacket, a water pump and a thermostat assembly. The engine water jacket, the thermostat assembly and the water pump are connected to form a circulation passage. The thermostat assembly is connected between the engine water jacket and the water pump. The engine water jacket includes a cylinder head water jacket and a cylinder block water jacket. The thermostat assembly is configured to enable the coolant to enter the cylinder head water jacket of the cylinder head water jacket and the cylinder block water jacket upon cold start.

16 Claims, 3 Drawing Sheets

(51) Int. Cl.
*F01P 7/16* (2006.01)
*F01P 7/14* (2006.01)

(52) U.S. Cl.
CPC ... *F01P 2003/021* (2013.01); *F01P 2003/024* (2013.01); *F01P 2007/146* (2013.01)

(56) References Cited

U.S. PATENT DOCUMENTS

| | | | | |
|---|---|---|---|---|
| 2012/0103283 | A1* | 5/2012 | Mehring | F01P 3/02 |
| | | | | 165/41 |
| 2013/0047940 | A1* | 2/2013 | Quix | F01P 7/165 |
| | | | | 123/41.82 R |
| 2020/0256278 | A1 | 8/2020 | Park et al. | |

FOREIGN PATENT DOCUMENTS

| | | |
|---|---|---|
| CN | 203978589 U | 12/2014 |
| CN | 106089470 A | 11/2016 |
| CN | 106640318 A | 5/2017 |
| CN | 107401445 A | 11/2017 |
| CN | 109139219 A | 1/2019 |
| CN | 209604129 U | 11/2019 |
| CN | 212079449 U | 12/2020 |
| CN | 213654973 U | 7/2021 |
| FR | 2842248 A1 | 1/2004 |

* cited by examiner

US 11,975,602 B2

VEHICLE AND ENGINE THEREOF

CROSS-REFERENCE TO RELATED APPLICATION

This application is a continuation application of International Patent Application No. PCT/CN2022/078301 filed with the China National Intellectual Property Administration (CNIPA) on Feb. 28, 2022, which is based on and claims priority to Chinese Patent Application No. 202110227888.2 filed on Mar. 1, 2021. The entire content of all of the above-identified applications is incorporated herein by reference.

FIELD

The present disclosure relates to the technical field of engine temperature control, and in particular to a vehicle and an engine thereof.

BACKGROUND

Existing thermostat generally include a single thermostat configured to adjust the temperature of the engine water jacket. The engine water jacket generally includes a cylinder head water jacket and a cylinder block water jacket. Upon cold start of the engine water jacket, the coolant enters the cylinder head water jacket and the cylinder block water jacket of the engine water jacket, causing flow of the coolant in the cylinder block water jacket. The coolant and the engine water jacket heat-up slowly, such that the machine warms-up slowly as well.

SUMMARY

The present disclosure provides a vehicle and an engine thereof and a thermostat assembly to solve the technical problems of slow heat-up of the engine water jacket and slow warm-up of the machine.

The present disclosure provides an engine, including an engine water jacket, a water pump and a thermostat assembly. The engine water jacket, the thermostat assembly and the water pump are connected to form a circulation passage. The thermostat assembly is connected between the engine water jacket and the water pump. The engine water jacket includes a cylinder head water jacket and a cylinder block water jacket. The thermostat assembly is configured to enable coolant to enter the cylinder head water jacket upon cold start.

In some embodiments, the thermostat assembly is further configured to enable the coolant to enter the cylinder head water jacket and the cylinder block water jacket as the temperature of the coolant rises.

In some embodiments, the cylinder block water jacket includes a water jacket insert. The water jacket insert divides the cylinder block water jacket into a first portion and a second portion, the first portion is closer to the cylinder head water jacket. The water jacket insert is configured to enable the first portion to contain more coolant than the second portion.

In some embodiments, the cylinder head water jacket includes an exhaust pipe, and the exhaust pipe includes an exhaust pipe cooling water jacket.

In some embodiments, the engine further includes a radiator. The thermostat assembly includes a first thermostat, a second thermostat and a bypass duct. The first thermostat includes a first accommodating space. The first thermostat includes a first water inlet, a second water inlet, a first water outlet and a second water outlet. The first water inlet, the second water inlet, the first water outlet and the second water outlet are connected to the first accommodating space. The first water inlet is connected to the cylinder head water jacket, the second water inlet is connected to the cylinder block water jacket, and the first water outlet is connected to the radiator. The second thermostat includes a second accommodating space. The second thermostat includes a third water inlet, a fourth water inlet and a third water outlet. The third water inlet, the fourth water inlet and the third water outlet are connected to the second accommodating space. The third water inlet is connected to the radiator, the third water outlet is connected to the cylinder head water jacket and the cylinder block water jacket. The second water outlet of the first thermostat is connected to the fourth water inlet of the second thermostat via the bypass duct. The circulation passage further comprises a third passage, the cylinder head water jacket, the cylinder block water jacket and the radiator are connected to the third passage.

In some embodiments, the first accommodating space includes a first control valve therein. The first control valve is configured to adjust the opening status of the second water inlet according to the temperature of the cylinder head water jacket.

In some embodiments, the second accommodating space includes a second control valve. The second control valve is configured to adjust the opening status of the fourth water inlet; and the second accommodating space includes a third control valve arranged at an interval from the second control valve and the third control valve is configured to control the opening status of the third water inlet.

In some embodiments, when the thermostat assembly closes the second control valve, the third control valve is opened; and when the temperature controller closes the third control valve, the second control valve is opened.

In some embodiments, the water pump is an electronic water pump.

The present disclosure provides a vehicle including the engine described above.

BRIEF DESCRIPTION OF THE DRAWINGS

In order to more clearly explain the technical solutions in the embodiments of the present disclosure or in related art, the drawings used in the description of the embodiments, or the related art will be briefly described below. Obviously, the drawings depicted below are merely some embodiments of the present disclosure, and those of ordinary skill in the art can obtain other drawings based on these drawings without any creative efforts.

DETAILED DESCRIPTION

The technical solutions in the embodiments of the present disclosure will be described clearly and fully with reference to the accompanying drawings in the embodiments of the present disclosure. Apparently, the embodiments described are merely some, rather than all of the embodiments of the present disclosure. All other embodiments obtained by those of ordinary skill in the art without creative efforts based on the embodiments of the present disclosure shall fall within the protection scope of the present disclosure.

The present disclosure provides a vehicle including an engine.

Figure 1:
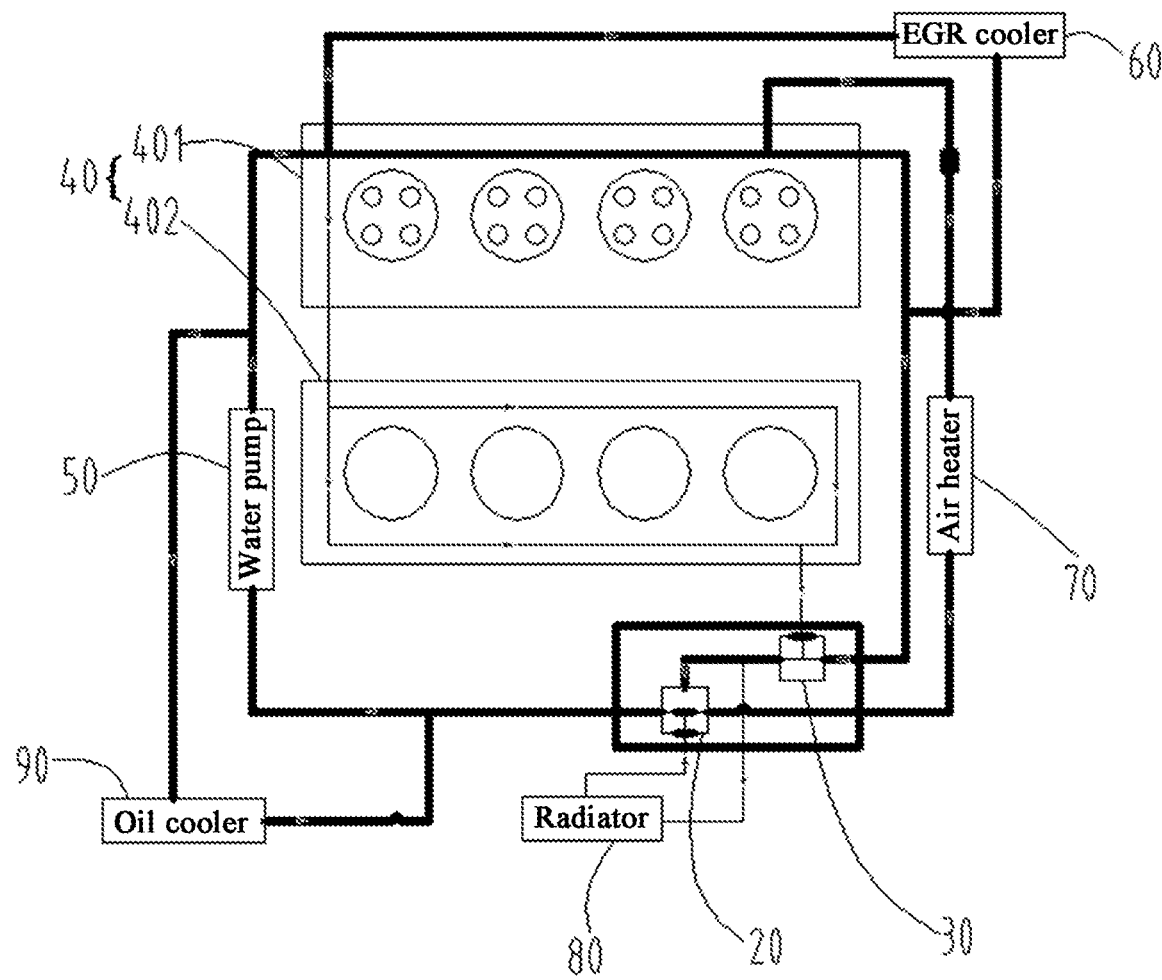
FIG. 1 is a schematic structural view of an engine according to an embodiment of the present disclosure.

Referring to FIG. 1, the engine includes an engine water jacket 40, a water pump 50 and a thermostat assembly. The engine water jacket 40, the thermostat assembly and the water pump 50 are connected to form a circulation passage. The thermostat assembly connects between the engine water jacket 40 and the water pump 50. The engine includes a cylinder head water jacket 401 and a cylinder block water jacket 402. The circulation passage includes a first passage to which the cylinder head water jacket 401 is connected. the engine may further include an air heater 70, an oil cooler 90 and an EGR cooler 60.

In the present disclosure, by providing that the cylinder head water jacket 401 is connected to the first passage, the coolant enters the cylinder head water jacket 401 of the engine water jacket 40 upon cold start of the engine water jacket 40 without entering the cylinder block water jacket 402 of the engine water jacket 40, and the cylinder block water jacket 402 does not lower the temperature of the coolant. As the coolant does not enter the cylinder block water jacket 402, the coolant in the cylinder block water jacket 402 does not flow, and because the temperature of the cylinder head is higher than the temperature of the cylinder block and the coolant may flow or only flow in the cylinder head at higher temperature, the heat-up process of the coolant is sped up so that the temperature of the engine water jacket 40 can quickly reach the required temperature, thereby reducing the warm-up time of the machine.

Therefore, in some embodiments, by providing that the cylinder head water jacket 401 is connected to the first passage, the coolant only enters the cylinder head water jacket 401 of the engine without entering the cylinder block water jacket 402 of the engine upon cold start of the engine, and the cylinder block water jacket 402 does not lower the temperature of the coolant. Also, as the coolant does not enter the cylinder block water jacket 402, the heat-up process of the coolant is sped up so that the temperature of the engine can quickly reach the required temperature, thereby reducing the warm-up time of the machine. As such, during cold start of the engine, the liquid in the cylinder block does not flow, which enables quick heat-up of the cylinder block and reduces frictional loss in the crankcase.

In some embodiments, the circulation passage further includes a second passage to which the cylinder head water jacket 401 and the cylinder block water jacket 402 are connected. For example, the cylinder head water jacket 401 and the cylinder block water jacket 402 are both connected to the second passage. As the temperature of the coolant rises, the circulation passage can be switched from the first passage to the second passage. In this process, although the temperature of the engine rises, the temperature of the engine has not reached the optimum operating temperature of the engine, and it is still necessary to increase the temperature of the engine water. However, it is necessary to protect the security of the cylinder block of the engine. By connecting the cylinder block water jacket 402 to the second passage, the cylinder block is protected during rise of the temperature of the engine, and fuel consumption and harmful gas emission can be reduced.

Figure 2:
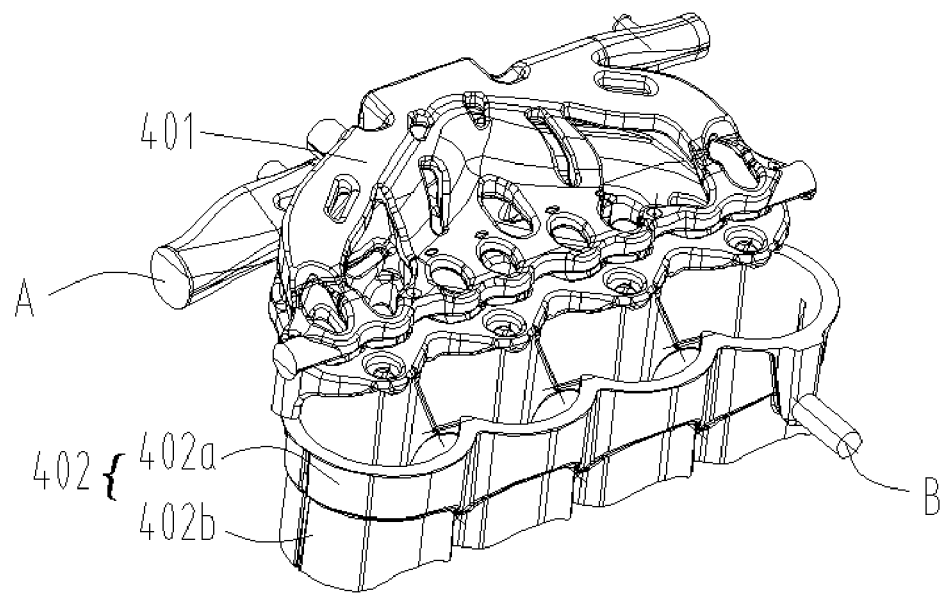
FIG. 2 is a schematic structural view of an engine water jacket in FIG. 1.
Figure 3:
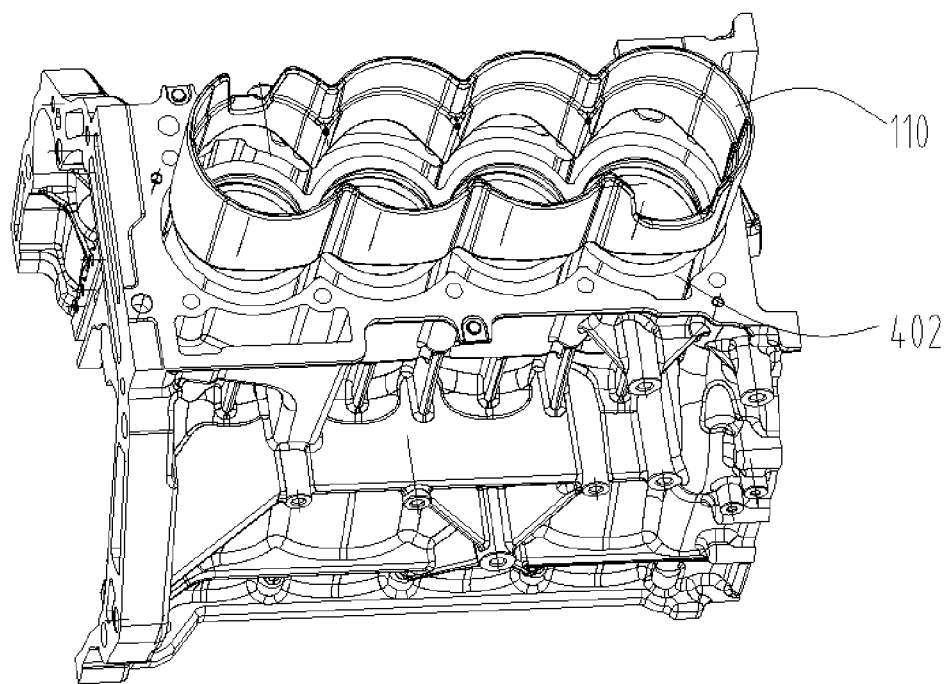
FIG. 3 is another schematic structural view of an engine water jacket in FIG. 1.

Referring to FIG. 2 and FIG. 3, in some embodiments, a water jacket insert 110 is formed in the cylinder block water jacket 402. The water jacket insert 110 divides the cylinder block water jacket 402 into a first portion 402*a* and a second portion 402*b*. The first portion 402*a* is disposed closer to the cylinder head water jacket 401. The water jacket insert 110 is configured to enable the first portion 402*a* to contain more coolant than the second portion 402*b*.

As such, in the present disclosure, by properly distributing the amount of coolant needed by various parts in the cylinder block water jacket 402, the amount of coolant in the second portion 402*b* is reduced, thereby speeding up warm-up process of the machine. It may be understood that when the engine needs cooling, the lower layer of the cylinder block water jacket 402 does not need to have very good cooling capacity. That is, the second portion 402*b* of the cylinder block water jacket 402 does not need very good cooling capacity, as long as deformation of the cylinder bore stays within a reasonable range. In consideration of the casting process of the cylinder block, adding the water jacket insert 110 enables the coolant to flow automatically in the cylinder block, so that the majority of the flow is concentrated to cool the upper portion of the cylinder block close to the combustion chamber (the first portion 402*a*) while there is less flow in the lower portion of the cylinder block (the second portion 402*b*). With respect to the lower portion of the cylinder block water jacket 402 (the second portion 402*b*), in consideration of deformation of the cylinder bore, the gap between the water jacket insert 110 and the wall of the water jacket can be determined through emulation and machinery development to achieve the optimum effect.

In some embodiments, an exhaust pipe is integrated to the cylinder head water jacket 401. The exhaust pipe is provided with an exhaust pipe cooling water jacket. It may be understood that the temperature on the exhaust side is much higher than the intake side of the engine.

In the present disclosure, as an exhaust pipe is integrated to the cylinder head water jacket 401 and the exhaust pipe is provided with an exhaust pipe cooling water jacket, the temperature of the cylinder head water jacket 401 can rise quickly by using the exhaust heat, so that warm-up process of the machine can be further sped up, thereby decreasing the fuel consumption and reducing the harmful gases emission. Compared with a traditional cylinder head water jacket, in the present disclosure, the intake side cooling water jacket on the cylinder head water jacket 401 is eliminated while still providing satisfactory reliability. As such, the volume of the cylinder head is significantly reduced, the volume of the engine is significantly reduced, the rising speed of the water temperature is significantly increased, and warm-up process of the machine is sped up.

Figure 4:
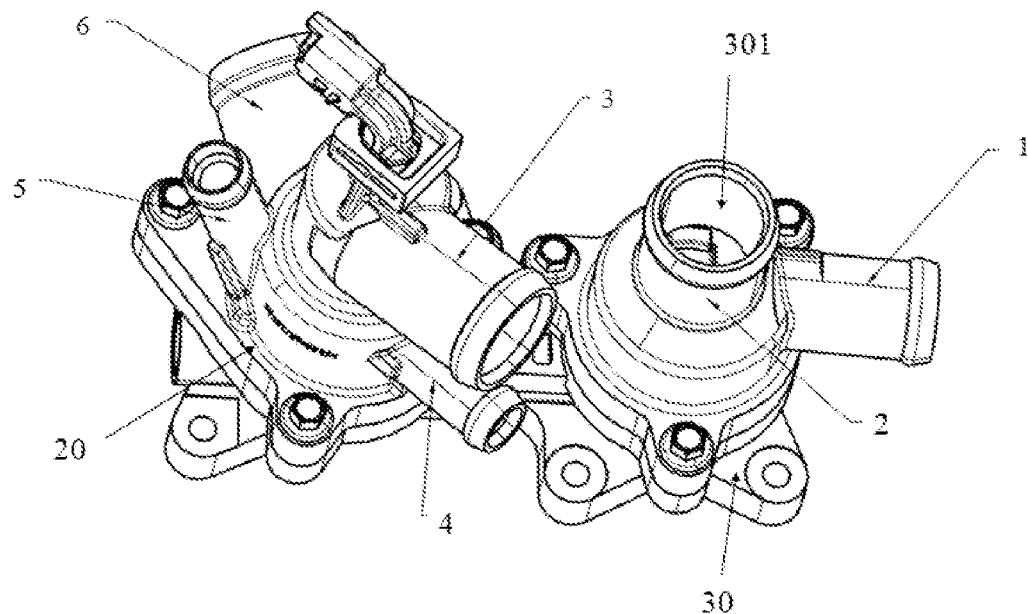
FIG. 4 is a schematic structural view of a thermostat assembly in FIG. 1.
Figure 5:
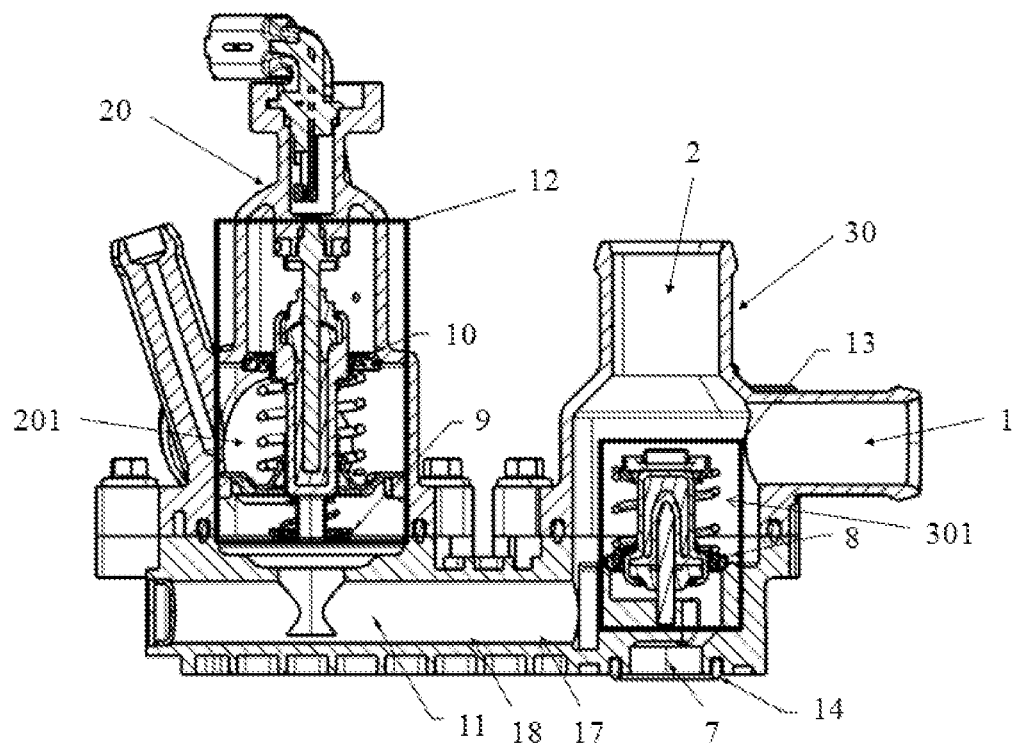
FIG. 5 is a schematic cross-sectional structural view of FIG. 4.

Referring to FIG. 4 and FIG. 5, in some embodiments, the engine further includes a radiator 80. The thermostat assembly includes a first thermostat 30, a second thermostat 20 and a bypass duct 11. A first accommodating space 301 is formed in the first thermostat 30. The first thermostat 30 is provided with a first water inlet 1, a second water inlet 7, a first water outlet 2 and a second water outlet 17. The first water inlet 1, the second water inlet 7, the first water outlet 2 and the second water outlet 17 connect to and communicate with the first accommodating space 301. The first water inlet 1 is connected to the cylinder head water jacket 401, and the second water inlet 7 is connected to the cylinder block water jacket 402. The first water outlet 2 is connected to the radiator 80.

A second accommodating space 201 is formed in the second thermostat 20. The second thermostat 20 is provided with a third water inlet 3, a fourth water inlet 18 and a third water outlet 6. The third water inlet 3, the fourth water inlet 18 and the third water outlet 6 communicate with and connect to the second accommodating space 201. The third water inlet 3 is connected to the radiator 80. The third water outlet 6 is connected to the cylinder head water jacket 401 and the cylinder block water jacket 402 respectively.

The second water outlet 17 of the first thermostat 30 is connected to the fourth water inlet 18 of the second thermostat 20 via the bypass duct 11.

The circulation passage further includes a third passage to which the cylinder head water jacket 401, the cylinder block water jacket 402 and the radiator 80 is connected. For example, the cylinder head water jacket 401, the cylinder block water jacket 402 and the radiator 80 are connected to the third passage. It may be understood that, as the temperature of the coolant rises, the circulation passage can be switched from the second passage to the third passage. In this process, as at the beginning, the coolant is of a great proportion in the bypass duct 11, the radiator 80 is partially opened, and the water temperature is still rising till it reaches a highwater temperature, whereupon the valve of the radiator 80 is opened or completely opened and the bypass duct 11 is closed, and the water temperature of the engine rises to a high level. In the present disclosure, the radiator 80 is utilized to reduce friction in the engine to provide economic benefits.

As such, in the present disclosure, by providing the first thermostat 30 and the second thermostat 20 which can jointly adjust the temperature of the engine water jacket 40, there is a variety of ways to adjust the temperature of the engine water jacket 40, so that the temperature of the engine water jacket 40 can be accurately controlled. Furthermore, a bypass duct may be integrated to the thermostat assembly in the present disclosure, which solves the technical problem of the high cost due to the need to add a separate bypass duct in a traditional single thermostat.

It may be understood that the cylinder head water jacket 401 is connected to the first water inlet 1 and the cylinder block water jacket 402 is connected to the second water inlet 7. The present disclosure solves the technical problem that the traditional single thermostat is arranged at the water outlet or water inlet of the engine and thus the water flow in and out of the cylinder block of the engine cannot be separately controlled and that the engine has a mono cooling mode. An engine is taken as an example for explanation hereinafter.

It may be understood that the coolant flowing through the cylinder head water jacket 401 can enter the first accommodating space 301 via the first water inlet 1, the coolant flowing through the cylinder block water jacket 402 can enter the first accommodating space 301 via the second water inlet 7, the coolant flowing through the first accommodating space 301 can flow out via the first water outlet 2 and enter the radiator 80, and the coolant flowing through the radiator 80 can enter the second accommodating space 201 via the third water inlet 3. The coolant in the first accommodating space 301 can also flow into the second accommodating space 201 via the second water outlet 17, the bypass duct 11 and the fourth water inlet 18 sequentially. The coolant in the second accommodating space 201 can be discharged from the third water outlet 6. The coolant may be cooling water. The third water inlet 3 is connected to the water outlet of the radiator 80 and the first water outlet 2 is connected to the water inlet of the radiator 80. The EGR cooler 60 is provided between the water inlet of the engine water jacket 40 and the thermostat assembly. For example, the EGR cooler 60 is provided between the water inlet of the cylinder head water jacket 401 and the first water inlet 1. The water pump 50 is connected to the entrance A of the cylinder head water jacket 401 and the first water inlet 1 is connected to the exit B of the cylinder block water jacket 402 (FIG. 2).

It may be understood that, as the first water inlet 1 is in communication with and connected to the cylinder head water jacket 401 and the second water inlet 7 is connected to and in communication with the cylinder block water jacket 402, the engine is connected to the first thermostat 30. As the second water outlet 17 is connected to the water pump 50, the water pump 50 is connected to the second thermostat 20. Therefore, the thermostat assembly in the present disclosure is connected between the engine and the water pump 50.

In some embodiments, the second thermostat 20 is further provided with at least one fifth water inlet. The fifth water inlet and the third water outlet 6 may be configured to remain opened. It may be understood that there may be two fifth water inlets. For example, in FIG. 4, a fifth water inlet 4 may be connected to an air heater 70 and another fifth water inlet 5 may be connected to an oil cooler 90. The third water outlet 6 may be connected to the cylinder block water jacket 402 via the water pump 50 and the cylinder head water jacket 401 sequentially. The third water outlet 6 may be connected to the cylinder head water jacket 401 via the water pump 50. As the fifth water inlet and the third water outlet 6 may be remain opened, the coolant can enter via the fifth water inlet and be discharged via the third water outlet 6 continuously.

In the present disclosure, the first water inlet 1, the second water inlet 7, the first water outlet 2, the third water inlet 3, the fifth water inlet and the third water outlet 6 are installed on the thermostat assembly. Six to seven pipe joints are integrated to the thermostat assembly in the present disclosure, which solves the technical problem that most existing thermostats only have two to three integrated pipe joints and other pipe joints are distributed over various pipes so that cost of the overall machine is increased due to low integration level.

In some embodiments, the first control valve 8 is configured to adjust the opening status of the second water inlet 7 according to the temperature of the cylinder head water jacket 401. For example, the first control valve 8 can adjust the opening status of the second water inlet 7 according to the temperature of the cylinder head water jacket 401. It may be understood that temperature-sensitive wax is provided in the first accommodating space 301. The temperature-sensitive wax can sense the temperature of the engine. The volume of the temperature-sensitive wax expands when the temperature is high to enable the first control valve 8 to be opened to a greater extent, and the volume of the temperature-sensitive wax shrinks when the temperature is low to enable the first control valve 8 to be opened to a less extent. The first control valve 8 controls the opening status of the second water inlet 7 through the volumetric change of the temperature-sensitive wax. The opening status of the second water inlet 7 in the present disclosure may be 0-100%, for example, 10%, 30%, 50%, 70% or 80% etc. Specifically, in the cylinder head water jacket 401, if the temperature of the cylinder head water jacket 401 rises, the temperature-sensitive wax expands. The first control valve 8 controls the second water inlet 7 to open and can gradually increase the opening status of the second water inlet 7. In the cylinder head water jacket 401, if the temperature of the cylinder head water jacket 401 decreases, the temperature-sensitive wax shrinks. The first control valve 8 gradually reduces the opening status of the second water inlet 7 and can control the second water inlet 7 to close. It may be understood that the temperature-sensitive wax can sense the temperature of the coolant flowing out of the cylinder head water jacket 401. That is, the temperature-sensitive wax senses the temperature of the cylinder head water jacket 401 by sensing the temperature of the coolant flowing out of the cylinder head water jacket 401.

In some embodiments, when the temperature of the coolant flowing through the cylinder head water jacket 401 is lower than the temperature of the cylinder block water jacket 402, the first control valve 8 controls the second water inlet 7 to close and the first passage is switched on. When the temperature of the coolant flowing through the cylinder head water jacket 401 is greater than or equal to the temperature of the cylinder block water jacket 402, the first control valve 8 controls the second water inlet 7 to be switched on and controls the opening status of the second water inlet 7, and the second passage is switched on. In some embodiments, the second water inlet 7 can be completely opened. The first control valve 8 and the parts in the first accommodating space 301 can form a mechanical control assembly 13. The first control valve 8 may be an electronic valve or a mechanical valve.

In some embodiments, the second accommodating space 201 is provided with a second control valve 9 therein. The second control valve 9 is configured to control the opening status of the fourth water inlet 18; and/or the second accommodating space 201 is provided with a third control valve 10 therein at an interval from the second control valve 9 and configured to control the opening status of the third water inlet 3. It may be understood that the opening status of the fourth water inlet 18 controlled by the second control valve 9 may be 0-100%, for example 10%, 30%, 50%, 70% or 80% etc. The second control valve 9 may be an electronic valve. The opening status of the third water inlet 3 controlled by the third control valve 10 may be 0-100%, for example 10%, 30%, 50%, 70% or 80% etc. The third control valve 10 may be an electronic valve. The second control valve 9 and the third control valve 10 may form an electronic valve assembly 12.

In some embodiments, the second thermostat 20 is provided with a temperature controller connected to the second control valve 9 and the third control valve 10. The temperature controller is configured to control the opening status of the second control valve 9 and the third control valve 10 according to the temperature of the engine water jacket 40. For example, the temperature controller can control the opening status of the second control valve 9 and the third control valve 10 according to the temperature of the engine. It may be understood that the temperature controller can separately control the opening status of the second control valve 9 or separately control the opening status of the third control valve 10, or simultaneously control the opening status of the second control valve 9 and the third control valve 10. The position of the second control valve 9 and the third control valve 10 is relatively fixed. The sum of the opening status of the second control valve 9 and the third control valve 10 may be 100%. For example, when the opening status of the second control valve 9 is 90%, the opening status of the third control valve 10 is 10%, or when the opening status of one of the second control valve 9 and the third control valve 10 is 0, the opening status of the other is 100%. When not energized, the temperature of the second control valve 9 and the third control valve 10 is high, and when the third control valve 10 is not opened, the opening status of the fourth water inlet 18 controlled by the second control valve 9 may be 100%. Temperature-sensitive wax is provided in the second accommodating space 201. The second thermostat 20 is provided with a temperature sensor connected to the temperature controller. The temperature sensor is configured to acquire the temperature of the engine. The temperature controller calculates the difference between the required temperature and the current temperature according to the temperature of the engine acquired by the temperature sensor (the current temperature), controls the expansion or shrinkage of the temperature-sensitive wax according to the difference, and controls the opening status of the second control valve 9 and the third control valve 10 according to the expansion or shrinkage of the temperature-sensitive wax. That is, the temperature controller can actively control the expansion or shrinkage of the temperature-sensitive wax and control the expansion amount or shrinkage amount of the temperature-sensitive wax, and consequently accurately control the opening status of the second control valve 9 and the third control valve 10. Furthermore, the fifth water inlet in the present disclosure is configured to remain opened to further enable the coolant to scour the temperature controller continuously, so that the temperature of the temperature-sensitive wax on the temperature controller is uniform.

In some embodiments, the second control valve 9 and the third control valve 10 are controlled with respect to each other. When the temperature controller closes the second control valve 9, the third control valve 10 is controlled to open; and when the temperature controller closes the third control valve 10, the second control valve 9 is controlled to open. It may be understood that the second control valve 9 and the third control valve 10 may be simultaneously partially opened, and the second control valve 9 and the third control valve 10 may have different opening status, or the same opening status. Of course, the second control valve 9 and the third control valve 10 may be alternately opened. For example, when the second control valve 9 is closed, the third control valve 10 is opened, and when the third control valve 10 is closed, the second control valve 9 is opened.

When the temperature of the engine sensed by the temperature sensor is lower than the temperature of the radiator 80, the temperature controller controls the second control valve 9 to open and the third control valve 10 to close. The second control valve 9 controls the fourth water inlet 18 to be switched on and controls the opening status of the fourth water inlet 18 to adjust the amount of the coolant flowing through the bypass duct 11 and controls the amount of the coolant circulating in the engine, so that the temperature of the engine can be adjusted more accurately. When the temperature of the engine sensed by the temperature sensor is greater than or equal to the temperature of the radiator 80, the temperature controller controls the third control valve 10 to open, and the third control valve 10 controls the third water inlet 3 to be switched on, and the third passage is switch-ed on. The third control valve 10 can control the opening status of the third water inlet 3, adjust the amount of the coolant flowing through the radiator 80, and control the amount of the coolant circulating in the engine, so that the temperature of the engine can be adjusted more accurately. It may be understood that when the third control valve 10 is opened, the second control valve 9 is partially opened or is closed. That is, the third water inlet 3 and the fourth water inlet 18 can be simultaneously partially opened, or the fourth water inlet 18 is closed while the third water inlet 3 is opened.

It may be understood that the first thermostat 30 above is a mechanical thermostat and the second thermostat 20 above is an electronic thermostat. In other implementations of the present disclosure, the first thermostat 30 may be an electronic thermostat and the second thermostat 20 may be an electronic thermostat as well. For the manners of adjusting the second thermostat 20, reference may be made to the first thermostat 30, and no description will be made again here in the present disclosure.

In some embodiments, the water pump 50 is an electronic water pump 50. The electronic water pump 50 can further control the flow of the engine. During warm-up of the machine, the policy of the electronic water pump 50 is determined through machinery development tests, and the minimum flow in the engine is determined in various operating conditions, in order to speed up temperature rise and reduce mechanical loss of the water pump 50.

As known from the above, the present disclosure includes at least the following four circulation situations:

First Situation:

when the temperature of the coolant is lower than the temperature of the first control valve 8, the first control valve 8 is closed and the second water inlet 7 is closed. The temperature controller controls the second control valve 9 to open so as to control the fourth water inlet 18 to be switched on and the bypass duct 11 is switched on. The temperature controller controls the third control valve 10 to close so as to control the third water inlet 3 to close.

The coolant is pumped from the water pump 50 to the circulation branch where the oil cooler 90 is located and the engine cylinder head water jacket 401. The coolant is split into two branches upstream of the cylinder head water jacket 401. One branch enters the EGR cooler 60, and the other branch flows through the cylinder head water jacket 401 and then is further split into two sub-branches downstream of the cylinder head water jacket 401 and close to the exit. One sub-branch of the coolant enters the air heater 70 and the other sub-branch of the coolant flows out via the rear-end exit of the cylinder head water jacket 401. The coolant flowing through the cylinder head water jacket 401 and the coolant flowing through the EGR enter the first accommodating chamber via the first water inlet 1 and then enter the second accommodating chamber via the bypass duct 11. The coolant flowing through the air heater 70 enters the second accommodating chamber via the fifth water inlet and the coolant entering the second accommodating chamber flows out via the third water outlet 6 after confluence and enters the water pump 50, thereby completing a cycle in the first passage.

Second Situation:

When the temperature of the coolant is greater than or equal to the temperature of the first control valve 8, the first control valve 8 is opened and the second water inlet 7 is switched on. The temperature controller controls the second control valve 9 to open so as to control the fourth water inlet 18 to be switched on and the bypass duct 11 is switched on. The temperature controller controls the third control valve 10 to close so as to control the third water inlet 3 to close.

The coolant is pumped from the water pump 50 to the circulation branch where the oil cooler 90 is located and the engine cylinder head water jacket 401. The coolant is split into three branches upstream of the cylinder head water jacket 401. The first branch enters the EGR cooler 60, the second branch flows through the cylinder head water jacket 401, and the third branch enters the cylinder block water jacket 402 via the cylinder head gasket hole. The coolant flowing through the cylinder head water jacket 401 is further split into two sub-branches downstream of the cylinder head water jacket 401 and close to the exit. One sub-branch of the coolant enters the air heater 70 and the other sub-branch of the coolant flows out via the rear-end exit of the cylinder head water jacket 401. The coolant flowing through the cylinder head water jacket 401, the coolant flowing through the EGR and the coolant flowing through the cylinder block water jacket 402 enter the first accommodating chamber via the first water inlet 1 and then enter the second accommodating chamber via the bypass duct 11. The coolant flowing through the air heater 70 enters the second accommodating chamber via the fifth water inlet and the coolant entering the second accommodating chamber flows out via the third water outlet 6 after confluence and enters the water pump 50, thereby completing a cycle in the second passage.

Third Situation:

The first control valve 8 is opened and the second water inlet 7 is switched on. The temperature controller controls the second control valve 9 to be partially opened so as to control the fourth water inlet 18 to be partially switched on and the bypass duct 11 is partially switched on. The temperature controller controls the third control valve 10 to be partially opened so as to control the third water inlet 3 to be partially switched on.

The coolant is pumped from the water pump 50 to the circulation branch where the oil cooler 90 is located and the engine cylinder head water jacket 401. The coolant is split into three branches upstream of the cylinder head water jacket 401. The first branch enters the EGR cooler 60, the second branch flows through the cylinder head water jacket 401, and the third branch enters the cylinder block water jacket 402 via the cylinder head gasket hole. The coolant flowing through the cylinder head water jacket 401 is further split into two sub-branches downstream of the cylinder head water jacket 401 and close to the exit. One sub-branch of the coolant enters the air heater 70 and the other sub-branch of the coolant flows out via the rear-end exit of the cylinder head water jacket 401. The coolant flowing through the cylinder head water jacket 401, the coolant flowing through the EGR and the coolant flowing through the cylinder block water jacket 402 enter the first accommodating chamber via the first water inlet 1. The coolant flowing out of the first accommodating chamber is split into two sub-branches. One sub-branch enters the second accommodating chamber through the bypass duct 11, and the other sub-branch enters the radiator 80 and then enters the second accommodating chamber thereafter. The coolant flowing through the air heater 70 enters the second accommodating chamber via the fifth water inlet. The coolant entering the second accommodating chamber flows out via the third water outlet 6 after confluence and enters the water pump 50, thereby completing a cycle in the third passage. In this situation, the engine operates under a low load. In this situation, the bypass duct 11 and the third water inlet 3 are both partially opened.

Fourth Situation:

The first control valve 8 is opened and the second water inlet 7 is switched on. The temperature controller controls the second control valve 9 to close so as to control the fourth water inlet 18 to close and the bypass duct 11 is closed. The temperature controller controls the third control valve 10 to open so as to control the third water inlet 3 to be switched on.

The coolant is pumped from the water pump 50 to the circulation branch where the oil cooler 90 is located and the engine cylinder head water jacket 401. The coolant is split into three branches upstream of the cylinder head water jacket 401. The first branch enters the EGR cooler 60, the second branch flows through the cylinder head water jacket 401, and the third branch enters the cylinder block water jacket 402 via the cylinder head gasket hole. The coolant flowing through the cylinder head water jacket 401 is further split into two sub-branches downstream of the cylinder head water jacket 401 and close to the exit. One sub-branch of the coolant enters the air heater 70 and the other sub-branch of the coolant flows out via the rear-end exit of the cylinder head water jacket 401. The coolant flowing through the cylinder head water jacket 401, the coolant flowing through the EGR and the coolant flowing through the cylinder block water jacket 402 enter the first accommodating chamber via the first water inlet 1. The coolant in the first accommodating chamber flows into the radiator 80 via the first water outlet 2 and then enters the second accommodating chamber via the third water inlet thereafter. The coolant flowing through the air heater 70 enters the second accommodating chamber via the fifth water inlet. The coolant entering the second accommodating chamber flows out via the third water outlet 6 after confluence and enters the water pump 50, thereby completing another cycle in the fourth passage. In this situation, the engine operates under a high load. In this situation, the bypass duct 11 is closed and the third water inlet 3 is opened or completely opened.

It may be understood that the first circulation situation and the second circulation situation are both small cycles and the third circulation situation and the fourth circulation situation are large cycles.

The thermostat assembly in the present disclosure has small cycle channels integrated therein that communicate the water outlet of the engine with the water inlet of the water pump 50. A small cycle pipe is eliminated, and the cost is reduced, and the footprint is reduced compared with a traditional single thermostat design. Also, in the case of a high load on the engine, the large cycle can be controlled to be opened and the small cycle can be controlled to be closed in the present disclosure, which facilitates heat dissipation.

In some embodiments, all the water inlets and all the water outlets may be integrated to the thermostat assembly so that there is sufficient space to accommodate all the water inlets and all the water outlets. The thermostat may be provided to have a small volume as compared with a traditional single thermostat design where all the water inlets and all the water outlets are integrated so that the traditional single thermostat has a large volume and a complex structure. The thermostat of the present disclosure has a small volume and a simple structure. Furthermore, the thermostat assembly of the present disclosure is provided with the second water inlet 7 connected to the cylinder block water jacket 402 and the first water inlet 1 connected to the cylinder head water jacket 401. The first water inlet 1 and the second water inlet 7 can both be provided to be short, thereby solving the technical problem of the traditional single thermostat that only one water inlet connected to the engine is provided, which requires long pipeline for the water inlet and consequently increased cost and additional footprint.

Three control valves are provided in the present disclosure to realize three circulation paths in the engine so that the water temperature of the engine can be accurately controlled, and the performance of the engine can be improved. In the thermostat assembly of the present disclosure, the first water inlet 1 and the second water inlet 7 arranged on the thermostat assembly before mounting of the radiator 80 shorten the length of the pipe between the engine and the water inlet and outlet of the radiator 80, and the positions of the interfaces to the water inlet and outlet of the radiator 80 have the same or substantially the same orientation, which facilitates assembly. The present thermostat assembly is arranged between the water pump 50 and the engine cylinder block water outlet. The first water inlet 1 may be directly connected to the cylinder head water jacket 401 and the second water inlet 7 may be directly connected to the cylinder block water jacket 402, which saves cost and space.

In some embodiments, the present engine has two thermostats. One is an electronic thermostat. Upon cold start, in order to warm up the machine quickly, the first thermostat 30 on the cylinder block is turned off and the second thermostat 20 in the large cycle is turned off, so that water in the cylinder block does not participate in the cycle, which causes the operating temperature of the engine to rise quickly. When the water temperature rises quickly to a certain temperature, considering that the local temperature of the parts of the cylinder block may be too high, the first thermostat 30 on the cylinder block needs to be turned on so that the coolant in the cylinder block water jacket 402 can participate in the cycle to ensure the reliability. When the water temperature continues to rise, and under a low load, it is expected to obtain a low frictional loss. At this time, the water temperature should be controlled to be a little higher. Therefore, only part of the water is allowed to enter the radiator 80 and the water temperature is caused to rise as high as possible within the temperature restriction so as to reduce the fuel consumption of the engine. During high load operation, the reliability of the engine becomes the major concern in the cooling system. The second thermostat 20 enables the coolant to enter the radiator 80 at an appropriate temperature so as to control the water temperature. In a large cycle condition, the optimum operating water temperature is obtained in various conditions according to machinery development tests, and the ON and OFF of the second thermostat 20 is controlled by the temperature controller (ECU) to adjust the flow temperature so as to enable the engine to operate at an optimum temperature.

The first thermostat 30 and the second thermostat 20 in the present disclosure increase the control range of the water temperature. The optimum water temperature can be found within the range of conditions of the overall engine with machinery development tests and emulation data. The adjustment range of the second thermostat 20 is controlled by the temperature controller (ECU) with the calibration data to adjust the optimum water temperature of the engine and reduce fuel consumption of the engine.

The engine of the present disclosure has a more compact structure while enabling quick warm-up of the machine. It reduces fuel consumption and emission of harmful gases upon cold start. The water temperature of the engine can be controlled accurately, so that different operating water temperatures are achieved at different rotation speeds and different loads. In this way, the engine is enabled to operate at the optimum temperature, thereby achieving the effect of economic emission.

The content disclosed above is only some embodiments of the present disclosure, and certainly is not intended to limit the scope of rights of the present disclosure. Those of ordinary skill in the art can understand that the implementation of all or part of the processes of the above-mentioned embodiments and equivalent changes made based on the claims of the present disclosure shall all fall within the scope of the present disclosure.

What is claimed is:

1. An engine, comprising:
    an engine water jacket;
    a water pump; and
    a thermostat assembly comprising a first thermostat, a second thermostat, and a bypass duct connected between the first thermostat and the second thermostat, wherein the first thermostat, the second thermostat, and the bypass duct are integrated together to form the thermostat assembly, and wherein the first thermostat is connected directly to the second thermostat through the bypass duct, wherein the engine water jacket, the thermostat assembly and the water pump are connected to form a circulation passage, the thermostat assembly is connected between the engine water jacket and the water pump, the engine water jacket comprises a cylinder head water jacket and a cylinder block water jacket, the thermostat assembly is configured to enable coolant to enter the cylinder head water jacket during cold start; and wherein the cylinder block water jacket comprises a water jacket insert, the water jacket insert divides the cylinder block water jacket into a first portion and a second portion, the first portion is closer than the second portion to the cylinder head water jacket, and the water jacket insert is configured to enable the first portion to contain more coolant than the second portion.

2. A vehicle, comprising an engine, wherein the engine comprises:
an engine water jacket;
a water pump; and
a thermostat assembly comprising a first thermostat, a second thermostat, and a bypass duct connected between the first thermostat and the second thermostat, wherein the first thermostat, the second thermostat, and the bypass duct are integrated together to form the thermostat assembly, and wherein the first thermostat is connected directly to the second thermostat through the bypass duct, wherein the engine water jacket, the thermostat assembly and the water pump are connected to form a circulation passage, the thermostat assembly is connected between the engine water jacket and the water pump, the engine water jacket comprises a cylinder head water jacket and a cylinder block water jacket, the thermostat assembly is configured to enable coolant to enter the cylinder head water jacket upon cold start; and wherein the cylinder block water jacket comprises a water jacket insert, the water jacket insert divides the cylinder block water jacket into a first portion and a second portion, the first portion is closer than the second portion to the cylinder head water jacket, and the water jacket insert is configured to enable the first portion to contain more coolant than the second portion.

3. The engine according to claim 1, wherein the cylinder head water jacket comprises an exhaust pipe, and the exhaust pipe comprises an exhaust pipe cooling water jacket.

4. The engine according to claim 1, further comprising a radiator, wherein
the first thermostat comprises:
a first accommodating space;
a first water inlet;
a second water inlet;
a first water outlet; and
a second water outlet; wherein
the first water inlet, the second water inlet, the first water outlet, and the second water outlet are connected to the first accommodating space, the first water inlet is connected to the cylinder head water jacket, the second water inlet is connected to the cylinder block water jacket, and the first water outlet is connected to the radiator;

the second thermostat comprises:
a second accommodating space;
a third water inlet;
a fourth water inlet; and
a third water outlet; wherein the third water inlet, the fourth water inlet, and the third water outlet are connected to the second accommodating space, the third water inlet is connected to the radiator, the third water outlet is connected to the cylinder head water jacket and the cylinder block water jacket;
the second water outlet of the first thermostat is connected to the fourth water inlet of the second thermostat via the bypass duct; and
the circulation passage further comprises a passage, and the cylinder head water jacket, the cylinder block water jacket, and the radiator are connected to the passage.

5. The engine according to claim 4, wherein
the first accommodating space comprises a first control valve, and the first control valve is configured to adjust an opening status of the second water inlet according to a temperature of the cylinder head water jacket.

6. The engine according to claim 5, wherein
the second accommodating space comprises a second control valve, and the second control valve is configured to adjust an opening status of the fourth water inlet; and
the second accommodating space comprises a third control valve arranged at an interval from the second control valve, and the third control valve is configured to control an opening status of the third water inlet.

7. The engine according to claim 6, wherein
when a temperature controller closes the second control valve, the third control valve is controlled to open; and
when the temperature controller closes the third control valve, the second control valve is controlled to open.

8. The engine according to claim 1, wherein the water pump is an electronic water pump.

9. A vehicle, comprising an engine, wherein
the engine comprises an engine water jacket;
a water pump; and
a thermostat assembly comprising a first thermostat, a second thermostat, and
a bypass duct connected between the first thermostat and the second thermostat,
wherein the engine water jacket, the thermostat assembly and the water pump are connected to form a circulation passage, the thermostat assembly is connected between the engine water jacket and the water pump, the engine water jacket comprises a cylinder head water jacket and a cylinder block water jacket, the thermostat assembly is configured to enable coolant to enter the cylinder head water jacket upon cold start.

10. The vehicle according to claim 9, wherein
the thermostat assembly is configured to enable the coolant to enter the cylinder head water jacket and the cylinder block water jacket as a temperature of the coolant rises.

11. The vehicle according to claim 9, wherein
the cylinder head water jacket comprises an exhaust pipe, and the exhaust pipe comprises an exhaust pipe cooling water jacket.

12. The vehicle according to claim 9, wherein the engine further comprises a radiator, wherein
the first thermostat comprises:
a first accommodating space;
a first water inlet;

a second water inlet;
a first water outlet; and
a second water outlet; wherein
the first water inlet, the second water inlet, the first water outlet, and the second water outlet are connected to the first accommodating space, the first water inlet is connected to the cylinder head water jacket, the second water inlet is connected to the cylinder block water jacket, and the first water outlet is connected to the radiator;

the second thermostat comprises:
a second accommodating space;
a third water inlet;
a fourth water inlet; and
a third water outlet; wherein
the third water inlet, the fourth water inlet, and the third water outlet are connected to the second accommodating space, the third water inlet is connected to the radiator, the third water outlet is connected to the cylinder head water jacket and the cylinder block water jacket;

the second water outlet of the first thermostat is connected to the fourth water inlet of the second thermostat via the bypass duct; and the circulation passage further comprises a third passage, and the cylinder head water jacket, the cylinder block water jacket and the radiator are connected to the third passage.

13. The vehicle according to claim 12, wherein
the first accommodating space comprises a first control valve, and the first control valve is configured to adjust an opening status of the second water inlet according to a temperature of the cylinder head water jacket.

14. The vehicle according to claim 13, wherein
the second accommodating space comprises a second control valve, and the second control valve is configured to adjust an opening status of the fourth water inlet; and
the second accommodating space comprises a third control valve arranged at an interval from the second control valve, and the third control valve is configured to control an opening status of the third water inlet.

15. The vehicle according to claim 14, wherein
when the thermostat assembly closes the second control valve, the third control valve is controlled to open; and
when the thermostat assembly closes the third control valve, the second control valve is controlled to open.

16. The vehicle according to claim 9, wherein
the water pump is an electronic water pump.

* * * * *